United States Patent
Miura (10) Patent No.: US 11,305,768 B2
(45) Date of Patent: Apr. 19, 2022

(54) METHOD AND DEVICE FOR CONTROLLING AUTONOMOUSLY DRIVEN VEHICLE

(71) Applicant: Nissan Motor Co., Ltd., Yokohama (JP)

(72) Inventor: Hajime Miura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 91 days.

(21) Appl. No.: 16/977,551

(22) PCT Filed: Mar. 27, 2018

(86) PCT No.: PCT/JP2018/012411
§ 371 (c)(1),
(2) Date: Sep. 2, 2020

(87) PCT Pub. No.: WO2019/186691
PCT Pub. Date: Oct. 3, 2019

(65) Prior Publication Data
US 2021/0001849 A1 Jan. 7, 2021

(51) Int. Cl.
*B60W 30/16* (2020.01)
*B60W 30/14* (2006.01)

(52) U.S. Cl.
CPC ........ *B60W 30/162* (2013.01); *B60W 30/146* (2013.01); *B60W 2520/105* (2013.01); *B60W 2554/404* (2020.02)

(58) Field of Classification Search
CPC ............. B60W 30/162; B60W 30/146; B60W 2520/105; B60W 2554/404
See application file for complete search history.

(56) References Cited

FOREIGN PATENT DOCUMENTS

| | | |
|---|---|---|
| JP | 6-191319 A | 7/1994 |
| JP | 2014-97708 A | 5/2014 |
| JP | 2015-24746 A | 2/2015 |

*Primary Examiner* — Alan D Hutchinson
*Assistant Examiner* — Andy Schneider
(74) *Attorney, Agent, or Firm* — Global IP Counselors, LLP (57) ABSTRACT

An acceleration rate is controlled so that a vehicle speed during autonomous driving is caused to approach a target vehicle speed. When a host vehicle has caught up with another vehicle traveling ahead of the host vehicle, the vehicle speed of the host vehicle is limited in accordance with a headway distance to the other vehicle. An acceleration rate is changed in accordance with a frequency with which the host vehicle catches up to a preceding vehicle, which is another vehicle immediately ahead of the host vehicle, and to another vehicle ahead of the preceding vehicle.

8 Claims, 4 Drawing Sheets

METHOD AND DEVICE FOR CONTROLLING AUTONOMOUSLY DRIVEN VEHICLE

CROSS-REFERENCE TO RELATED APPLICATIONS

This application is a U.S. national stage application of International Application No. PCT/JP2018/012411, filed on Mar. 27, 2018.

BACKGROUND

Technical Field

The present invention relates to a method and a device for controlling an autonomously driven vehicle, and particularly relates to a technique that improves fuel consumption by optimizing acceleration.

Background Information

JP-A 2015-024746 discloses a technique that causes a host vehicle to accelerate at a predetermined acceleration rate toward a target vehicle speed (paragraph [0013]).

SUMMARY

However, with the technique described in the abovementioned document, a characteristic when the host vehicle is caused to accelerate (acceleration rate characteristic) does not necessarily conform to an actual traffic situation of a road being traveled on.

For example, the following concerns arise. In a situation in which, during travel on a high-speed road, a preceding vehicle is traveling ahead of the host vehicle and another vehicle is traveling ahead of the preceding vehicle (another vehicle that is two vehicles ahead of the host vehicle is sometimes referred to particularly as a "vehicle two car lengths ahead"), when the host vehicle accelerates and catches up to the preceding vehicle traveling at a vehicle speed lower than the target vehicle speed, and the preceding vehicle then performs an action such as a lane change, opening up the road ahead of the host vehicle, the host vehicle then further accelerates toward the target vehicle speed. In this example, when the acceleration rate is excessively high, there is a concern that the host vehicle will catch up to the vehicle two car lengths ahead either before reaching the target vehicle speed or immediately after reaching the target vehicle speed, whereby sudden acceleration and stopping or braking will be repeated in a short time, and fuel will be wastefully consumed. Conversely, when the acceleration rate is excessively low, there is concern that slow acceleration will be continued over a long time, and not only will drivability be compromised, but fuel consumption will increase even further.

Thus, merely setting an acceleration rate does not necessarily result in an optimal state from the standpoint of fuel consumption, etc., and there is yet room for improvement.

An object of the present invention is to provide a method and device for controlling an autonomously driven vehicle in which the problem described above is taken into consideration.

The invention according to one aspect provides a control method for an autonomously driven vehicle in which: an acceleration rate of a host vehicle is controlled so as to bring a vehicle speed near a target vehicle speed, and when the host vehicle has caught up with another vehicle traveling ahead of the host vehicle, the vehicle speed of the host vehicle is limited in accordance with a headway distance to the other vehicle, and the acceleration rate is changed in accordance with a frequency with which the host vehicle catches up to a preceding vehicle, which is another vehicle immediately in front of the host vehicle, and to another vehicle ahead of the preceding vehicle.

The invention according to another aspect provides a device for controlling the autonomously driven vehicle.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the drawings.

Overall Configuration of System

Figure 1:
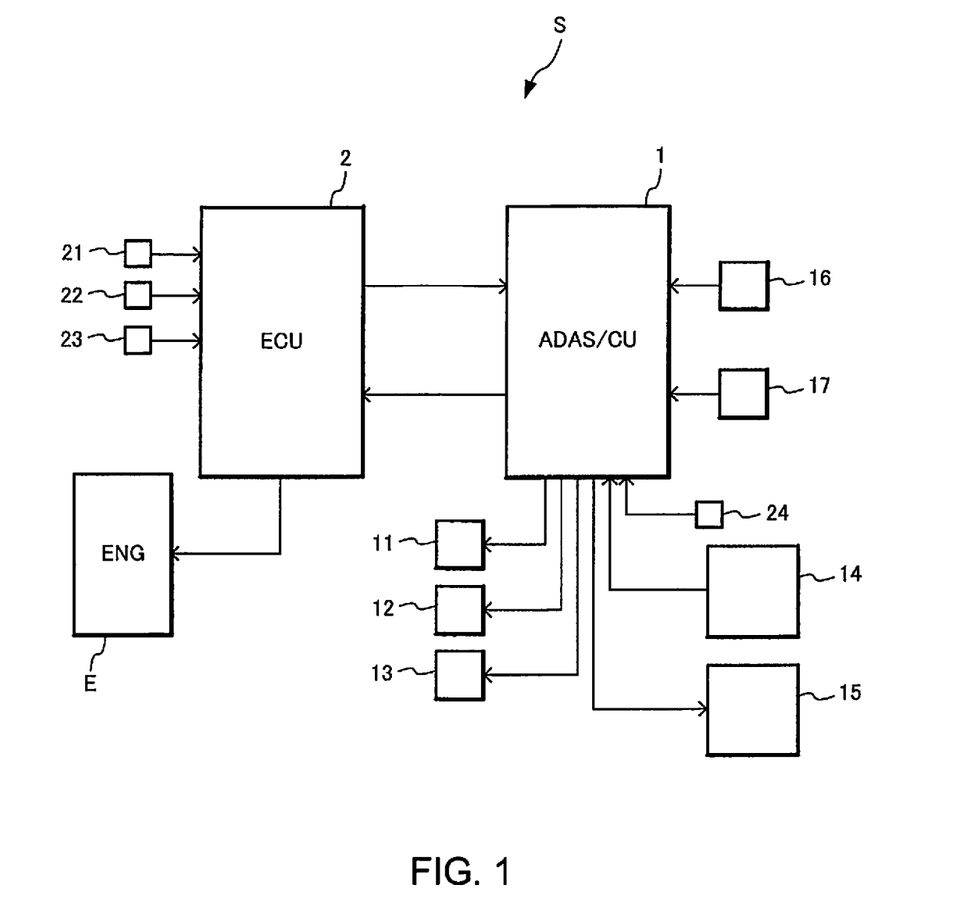
FIG. 1 is a schematic diagram of an overall configuration of a control system for an autonomously driven vehicle according to one embodiment of the present invention.

FIG. 1 schematically depicts an overall configuration of a control system S for an autonomously driven vehicle (referred to below as a "vehicle control system") according to one embodiment of the present invention.

The vehicle control system S comprises an internal combustion engine (referred to below simply as an "engine") E which is a drive source for a vehicle, a driving assistance system controller (ADAS/CU) 1, and an engine controller (ECU) 2.

The engine controller 2 controls actions of the engine E, and controls output of the engine E by adjusting an amount of air taken into the engine E, an amount of fuel supplied to the engine E, etc. The engine controller 2 is communicably connected to the driving assistance system controller 1, and the engine controller inputs, as information pertaining to engine control, a signal from an acceleration sensor 21 that detects accelerator pedal depression by a driver, a signal from a speed sensor 22 that detects a speed of the engine E, a signal from a water temperature sensor 23 that detects a temperature of cooling water for the engine E, etc. The engine E is not provided by way of limitation as to the drive source of the vehicle; the drive source may be an electric motor or a combination of the engine E and an electric motor. A suitable controller would naturally replace the engine controller 2 depending on the type of drive source.

The driving assistance system controller 1 sets various control parameters pertaining to autonomous driving of the vehicle and outputs command signals corresponding to the control parameters to various devices (e.g., the engine E and an automatic transmission (not shown)) associated with autonomous driving. In the present embodiment, the term "autonomous driving" refers to a driving state in which, based on observations made by the driver, it is possible at any time for the driver to return to manual driving as the driver chooses, and the operations of acceleration, braking, and steering are all the function of the control system. This driving state is not provided by way of limitation as to classifications of automatization or levels of autonomous driving to which the present embodiment can be applied. In the present embodiment, vehicle speed is basically controlled under autonomous driving so as to approach a target vehicle speed set by the driver or established by law, etc. An acceleration rate or deceleration rate of the vehicle set when the vehicle speed is controlled is equivalent to a control parameter pertaining to autonomous driving. A characteristic when the acceleration rate is set (acceleration rate characteristic) is switched according to road attributes, etc., or according to an actual traffic situation of a road being traveled on. In the present embodiment, two driving modes (high acceleration mode, low acceleration mode) are set, these modes having different acceleration rates relative to a target vehicle speed Vtrg, and an acceleration rate characteristic (high acceleration rate characteristic, low acceleration rate characteristic) that has been made to conform to each driving mode is employed.

In addition to the engine E, the vehicle control system S comprises, as devices associated with autonomous driving of the vehicle, an autonomous steering device 11, an autonomous wheel brake device 12, and an autonomous parking brake device 13. The autonomous steering device 11, the autonomous wheel brake device 12, and the autonomous parking brake device 13 can each be activated in accordance with a command signal from the driving assistance system controller 1. The autonomous steering device 11 is a device for changing an advancing direction and reversing direction of the vehicle during autonomous driving, the autonomous wheel brake device 12 is a device for causing braking force to be generated in the vehicle regardless of operation of a brake pedal by the driver, and the autonomous parking brake device 13 is a device for autonomously actuating a parking brake when a system starter switch of the vehicle is in an off state.

Furthermore, the vehicle control system S comprises a switch device 14 for switching between autonomous driving and manual driving as the driver chooses and setting a travel condition during autonomous driving, and a display device 15 for informing the driver of the actuated state of autonomous driving and the travel state of the vehicle. In the present embodiment, the switch device 14 is configured as a collective switch (referred to below as a "handle switch") provided adjacent to a gripped part of a steering wheel, and is provided with an operation part for switching autonomously between on and off and also switching a set vehicle speed and a set vehicle-to-vehicle distance. The display device (referred to below as a "meter display") 15 is installed in a dashboard of a driver's seat, configured such that the on or off state of autonomous driving can be visually recognized (for example, by using different display colors for the on state and the off state of autonomous driving), and provided with a display section that displays the set vehicle speed and the set vehicle-to-vehicle distance. The display device 15 can also be realized in the form of a head-up display.

In the present embodiment, the driving assistance system controller 1 and the engine controller 2 are configured as electronic control units that are each provided with a microcomputer composed of a central computation device (CPU), a ROM, RAM, and other various storage devices, an input/output interface, etc.

The driving assistance system controller 1 inputs, as information pertaining to autonomous driving, not only a signal from the handle switch 14, but also a signal from a travel environment recognition device 16 and a traveling vehicle monitoring device 17.

The travel environment recognition device 16 is for recognizing the environment or surrounding situation where the host vehicle is located, and can be realized in the form of, for example, an optical camera sensor. The travel environment recognition device 16 may be composed of a plurality of optical camera sensors having different sensing distances or viewing angles.

The traveling vehicle monitoring device 17 is for monitoring a preceding vehicle in a range not more than a predetermined distance ahead of the host vehicle, and can be realized in the form of an optical camera sensor, as well as a radar sensor, e.g., a milli-wave radar sensor. The traveling vehicle monitoring device 17 outputs a signal corresponding to a headway distance between the host vehicle and a preceding vehicle when there is a preceding vehicle. On the basis of the signal from the traveling vehicle monitoring device 17, a relative speed of the preceding vehicle, relative to the host vehicle, can be specifically detected from a rate of change per unit time in the headway distance.

The travel environment recognition device 16 and the traveling vehicle monitoring device 17 need not be discrete sensors and can also be configured as one sensor unit; these devices can be configured together from an optical camera sensor, a laser radar sensor (LiDAR), etc.

In addition to the above, the driving assistance system controller 1 inputs a signal from a vehicle speed sensor 24, which detects a vehicle speed VSP. A signal indicating the vehicle speed VSP can be inputted via the engine controller 2.

Actions of Control System

When autonomous driving is selected by operating the handle switch 14, target acceleration and deceleration rates are set on the basis of the traveling state of the host vehicle, the traveling state of a vehicle (e.g., a preceding vehicle) other than the host vehicle, the surrounding traffic situation, etc. The driving assistance system controller 1 sets a required propulsion force for the vehicle needed to achieve the target acceleration rate, and outputs to the engine controller 2 a command signal for causing an output torque corresponding to the required propulsion force to be generated by the engine E, which is the drive source. The driving assistance system controller 1 further sets a required braking force for the vehicle needed to achieve the target deceleration rate, and outputs a command signal corresponding to the required braking force to the autonomous wheel brake device 12.

In the present embodiment, the driving assistance system controller 1 designates a maximum vehicle speed indicated by a road sign or established by law, etc., as a limit vehicle speed, selects whichever is the lower of the vehicle speed set by the driver (sometimes referred to below as the "set vehicle speed") and the limit vehicle speed, and sets this selected speed as a target vehicle speed (Vtrg). The required propulsion force is set and a command signal for the engine controller 2 is outputted so that the vehicle speed VSP is made to approach the target vehicle speed Vtrg at a target acceleration rate $\alpha trg$ corresponding to the current vehicle speed VSP. The vehicle thereby basically performs steady-speed travel at the target vehicle speed Vtrg during autonomous driving.

By contrast, when there is another vehicle (a preceding vehicle) traveling within a predetermined range ahead of the host vehicle, or specifically within a range that can be recognized by the milli-wave radar sensor 17, the vehicle speed VSP of the host vehicle is limited so that a headway distance of at least a set headway distance is maintained with the preceding vehicle, regardless of the target vehicle speed Vtrg. In the present embodiment, the vehicle speed VSP is limited so that the speed of the host vehicle relative to the preceding vehicle is 0 when the headway distance to the preceding vehicle is the set headway distance. The vehicle speed VSP in this case depends on the speed of the preceding vehicle. As another option, the limiting of the vehicle speed VSP may simply prompt relative deceleration of the host vehicle when, for example, the host vehicle has neared the preceding vehicle past a position at the predetermined headway distance.

Autonomous driving is canceled by the handle switch 14 being operated by the driver or by any operation associated with vehicle behavior being performed (e.g., the steering wheel or the brake pedal being operated by the driver).

The description below presents a situation in which there is a preceding vehicle traveling ahead of the host vehicle, and another vehicle traveling ahead of the preceding vehicle. A case of traveling on a high-speed road can be given as an example of such a situation. The term "other vehicles" is used to refer to all vehicles other than the host vehicle, and the preceding vehicle and the vehicle two car lengths ahead are included among the "other vehicles." The term "preceding vehicle" refers to another vehicle traveling immediately in front of the host vehicle. Furthermore, the phrase "another vehicle traveling even further ahead (of the preceding vehicle)" refers to another vehicle that is traveling ahead of the preceding vehicle and that is one, two, or more car lengths ahead [of the host vehicle]; a vehicle two car lengths ahead is not a limitation as to this phrase. The phrase "another vehicle traveling ahead of the host vehicle" is used to refer to all other vehicles traveling ahead of the host vehicle, including a preceding vehicle.

Description According to Flowchart

Figure 2:
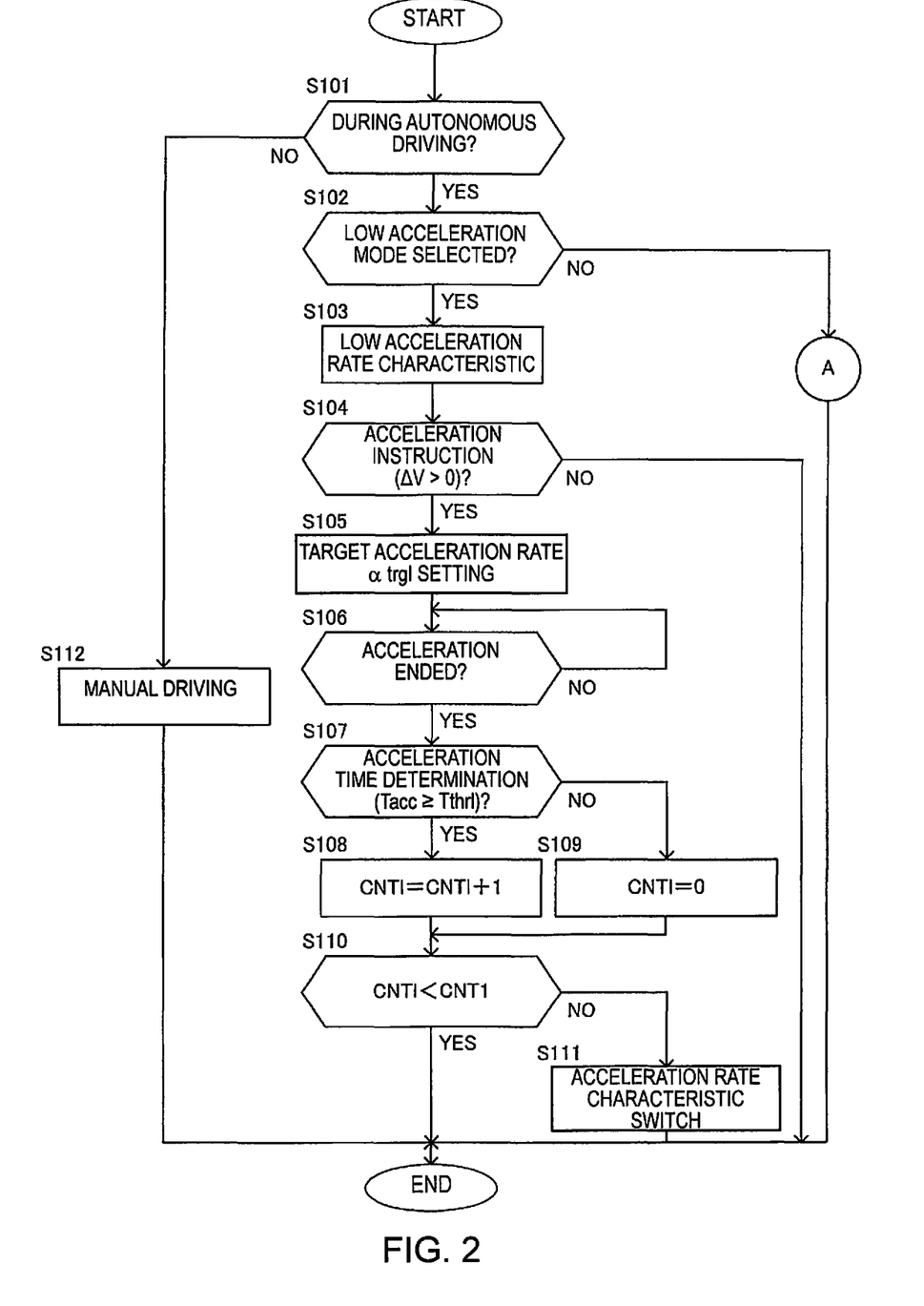
FIG. 2 is a flowchart of a basic flow of control (vehicle propulsion control) executed by the control system during autonomous driving.
Figure 3:
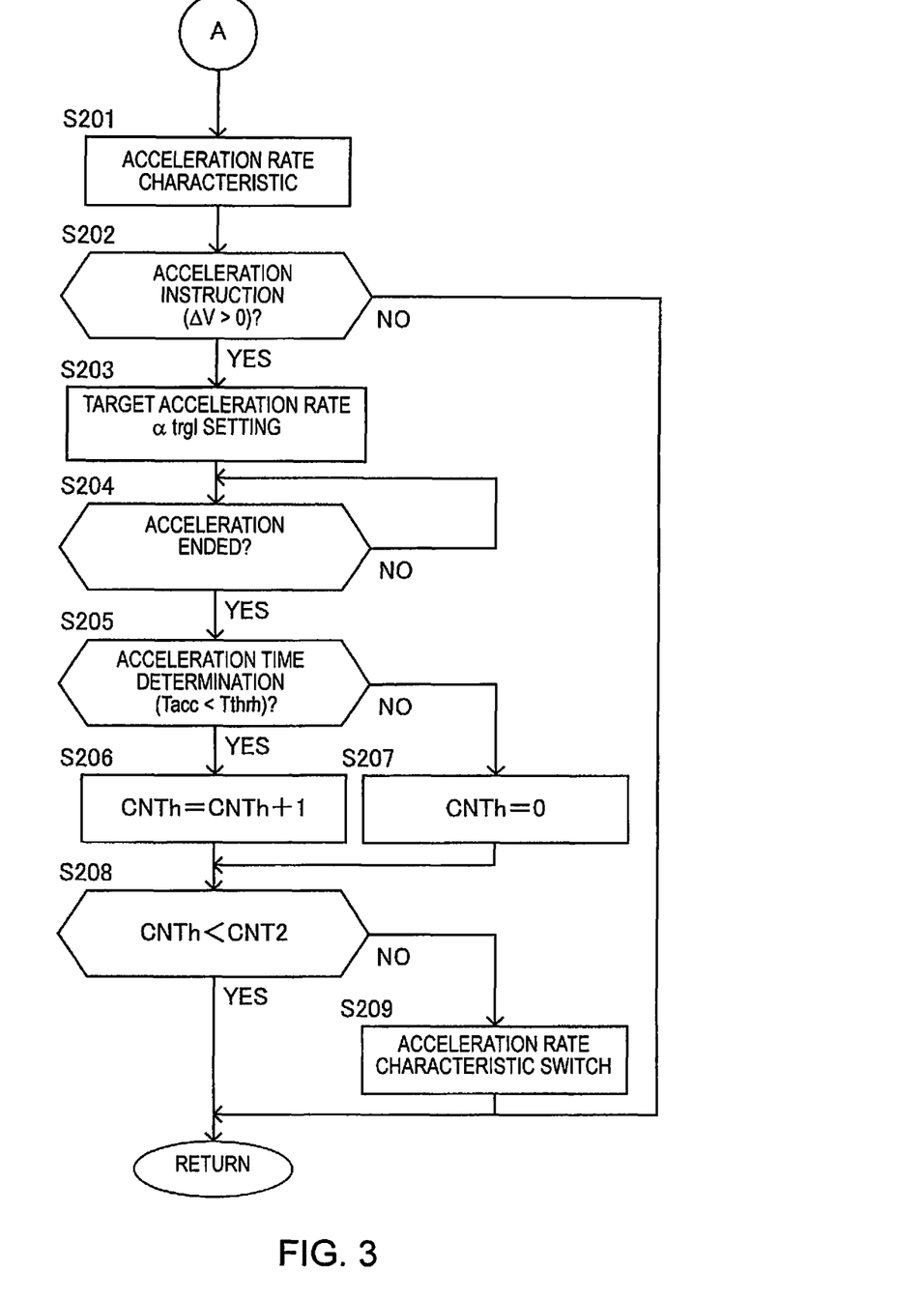
FIG. 3 is a flowchart of specifics of a process in a section A of the control executed by the control system.

FIGS. 2 and 3 use flowcharts to show the basic flow of control (vehicle propulsion control) performed by the driving assistance system controller 1 according to the present embodiment. FIG. 3 shows specifics of process executed in section A of the flowchart shown in FIG. 2. The driving assistance system controller 1 is programmed so as to execute vehicle propulsion control at predetermined time intervals. When a target vehicle speed Vtrg higher than the current vehicle speed VSP is set and an acceleration instruction for bringing the vehicle speed VSP near to the target vehicle speed Vtrg is outputted, [the controller] waits until acceleration ends and executes a determination of conformity to the acceleration rate characteristic (steps S107 to 111 and S205 to 209).

In the flowchart shown in FIG. 2, whether or not the host vehicle is currently in autonomous driving is determined in S101. Whether or not the host vehicle is currently in autonomous driving can be determined on the basis of a signal from the handle switch 14. When the host vehicle is currently in autonomous driving, the process advances to S102, and when the host vehicle is not currently in autonomous driving, the process advances to S112.

In S102, whether or not the currently selected driving mode is the low acceleration mode is determined. The low acceleration mode is a driving mode in which the target acceleration rate αtrg set for the acceleration request is kept low (=αtrgl). When the currently selected driving mode is the low acceleration mode, the process advances to S103, otherwise the process advances to the flowchart shown in FIG. 3. The driving mode is basically switched in accordance with the attributes of the road, the limited vehicle speed, etc. In the present embodiment, the high acceleration mode is set by default during travel on a high-speed road, and the low acceleration mode is set during travel on a common road in other cases.

In S103, a low acceleration rate characteristic is selected as the acceleration rate characteristic for the low acceleration mode. In the present embodiment, selecting the low acceleration rate characteristic involves selecting a low acceleration gain gl as the acceleration gain g used to calculate the target acceleration rate αtrgl. The low acceleration rate characteristic is equivalent to a "second acceleration rate characteristic."

In S104, whether or not there is an acceleration instruction is determined. The presence or absence of an acceleration instruction is determined on the basis of a vehicle speed difference ΔV, which is a difference between the target vehicle speed Vtrg and the current vehicle speed VSP; this determination is made according to whether or not the vehicle speed difference ΔV is greater than 0. When there is an acceleration instruction, the process advances to S105, and when there is no acceleration instruction, the current control is ended.

Figure 4:
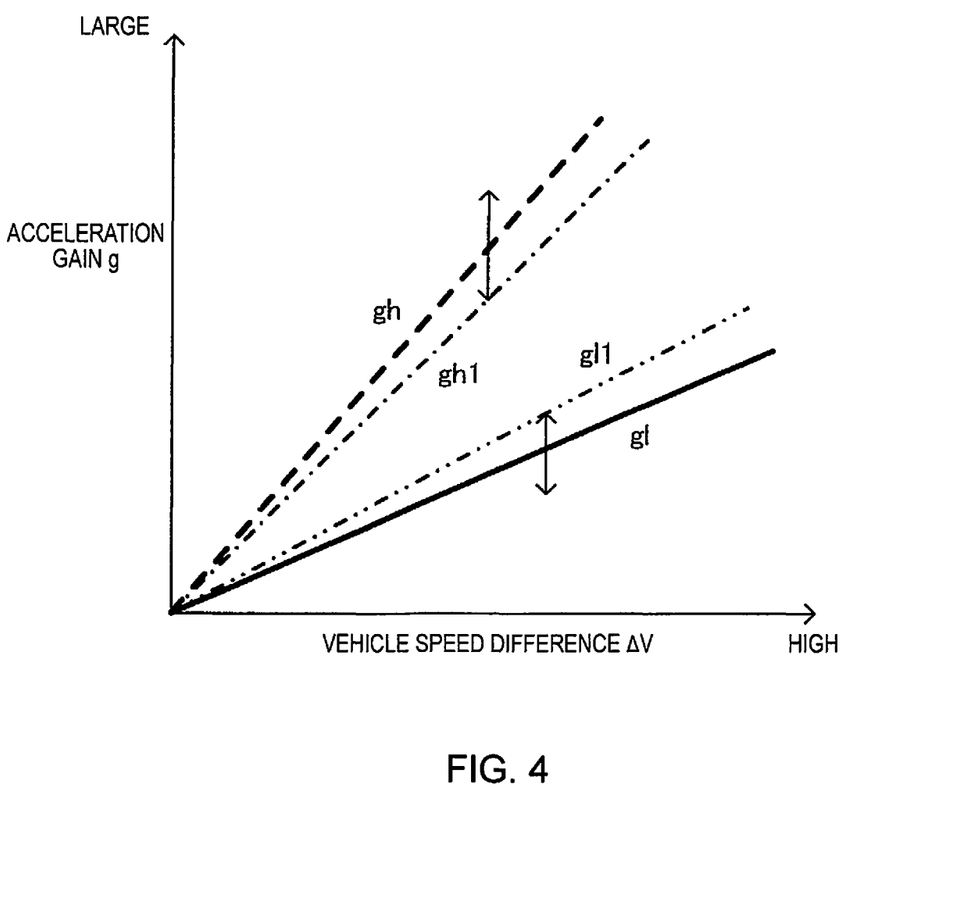
FIG. 4 is a schematic diagram of a relationship between an acceleration gain g and a vehicle speed difference ΔV.

In S105, the target acceleration rate αtrgl is calculated. The target acceleration rate αtrg is calculated by multiplying the acceleration gain g (=gl) by the vehicle speed difference ΔV, as shown in the following formula (1). The acceleration gain g is switched in accordance with the driving mode, and in the low acceleration mode, the low acceleration gain gl is selected in order for the low acceleration rate characteristic to be selected. As shown in FIG. 4, the low acceleration gain gl increases in accordance with the expansion of the vehicle speed difference ΔV, but throughout the entire vehicle speed difference ΔV, this gain gl is a smaller value than a high acceleration gain gh described hereinafter.

$$\alpha trg = g \times \Delta V = g \times (Vtrg - VSP) \qquad (1)$$

In S106, whether or not the current acceleration has ended is determined. The acceleration ending is basically determined due to the vehicle speed difference ΔV having decreased along with the acceleration and reached 0; in other words, due to the vehicle speed VSP having reached the target vehicle speed Vtrg, but in the present embodiment, the acceleration ending is also determined due to the host vehicle catching up to another vehicle traveling ahead before the vehicle speed difference ΔV reaches 0 (i.e., while accelerating) and further acceleration being limited. When acceleration has ended, the process advances to S107, and when acceleration has not ended, the process waits until acceleration ends.

In S107, a determination is made as to whether or not the current acceleration has continued for at least a predetermined time Tthrl. Specifically, a time (referred to below as an "acceleration continuation time") Tacc for which the current acceleration has continued is calculated and whether or not this time is equal to or greater than the predetermined time Tthrl is determined. The acceleration continuation time Tacc is calculated by measuring the time from the start of acceleration at which the vehicle speed difference ΔV is greater than 0, until the end of acceleration at which the acceleration ending is determined in S106. When the acceleration continuation time Tacc is equal to or greater than the predetermined time Tthrl, the process advances to S108, and when the time Tacc is less than the predetermined time Tthrl, the process advances to S109.

In S108, 1 is added to a value CNTl of a counter for the low acceleration mode.

$$CNTl = CNTl + 1 \quad (2)$$

In S109, the counter value CNTl is reset to 0.

In S110, a determination is made as to whether or not the counter value CNTl after having 1 added is less than a predetermined value CNTl. When the counter value is less than the predetermined value CNTl, the current control is ended with no further steps, and when the counter value is equal to or greater than the predetermined value CNTl, the process advances to S111.

In S111, the acceleration rate characteristic is switched from the currently selected low acceleration rate characteristic to the high acceleration rate characteristic. In other words, in the low acceleration mode, acceleration continues for the number of times established by the predetermined value CNTl through the process of S107-111, and when a long acceleration continuing for at least the predetermined time TthrI has been experienced, the acceleration rate characteristic is switched. In the present embodiment, the driving mode itself is switched to the high acceleration mode in order to switch the acceleration rate characteristic.

In S112, driving is executed through the manual operations of the driver. Specifically, an acceleration rate $\alpha$ is controlled on the basis of the amount by which the accelerator pedal is pressed.

Moving on to the flowchart shown in FIG. 3, in S201, the high acceleration rate characteristic is selected as the acceleration rate characteristic for the high acceleration mode. Specifically, the high acceleration gain gh is selected as the acceleration gain g used to calculate the target acceleration rate $\alpha$trg. The high acceleration rate characteristic is equivalent to a "first acceleration rate characteristic."

In S202, whether or not there is an acceleration instruction is determined. Specifically, a determination is made as to whether or not the vehicle speed difference $\Delta V$, which is the difference between the target vehicle speed Vtrg and the current vehicle speed VSP, is greater than 0. When there is an acceleration instruction, the process advances to S203, and when there is no acceleration instruction, the flowchart shown in FIG. 2 is resumed and the current control is ended.

In S203, a target acceleration rate $\alpha$trgh is calculated. Specifically, in the same manner as the calculation of the target acceleration rate $\alpha$trgl, the high acceleration gain gh for the high acceleration mode is multiplied by the vehicle speed difference $\Delta V$ according to the formula (1) above. The high acceleration gain gh has the inclination shown in FIG. 4 relative to the vehicle speed difference $\Delta V$, and this gain increases relative to the expansion of the vehicle speed difference $\Delta V$.

In S204, whether or not the current acceleration has ended is determined. Specifically, a determination is made either as to whether the vehicle speed difference $\Delta V$ is 0, and if not, whether the host vehicle has caught up with the other vehicle traveling ahead. When acceleration has ended, the process advances to S205, and when acceleration has not ended, the process waits until acceleration ends.

In S205, a determination is made as to whether or not the acceleration continuation time Tacc relating to the current acceleration is less than a predetermined time Tthrh. When the acceleration continuation time Tacc is less than the predetermined time Tthrh, the process advances to S206, and when the time Tacc is equal to or greater than the predetermined time Tthrh, the process advances to S207.

In S206, 1 is added to a value CNTh of a counter for the high acceleration mode.

$$CNTh = CNTh + 1 \quad (3)$$

In S207, the counter value CNTh is reset to 0.

In S208, a determination is made as to whether or not the counter value CNTh after having 1 added is less than a predetermined value CNT2. When the counter value is less than the predetermined value CNT2, the current control is ended with no further steps, and when the counter value is equal to or greater than the predetermined value CNT2, the process advances to S209.

In S209, the acceleration rate characteristic is switched from the currently selected high acceleration rate characteristic to the low acceleration rate characteristic. In other words, in the high acceleration mode, acceleration continues for the number of times established by the predetermined value CNT2 through the process of S205-209, and when a short acceleration ending before the predetermined time Tthrh has been experienced, the acceleration rate characteristic is switched. In the present embodiment, the driving mode is switched to the low acceleration mode in order to switch the acceleration rate characteristic. In this embodiment, the predetermined time Tthrh relating to the conformity determination in the high acceleration mode may be a length equal to the predetermined time TthrI relating to the conformity determination in the low acceleration mode, or it may be a different length. Furthermore, the determined values CNT1, CNT2 of the number of times may be the same in the high acceleration mode and the low acceleration mode, or they may be different.

In the present embodiment, a "drive source" is configured from the engine E, and a "controller" is configured from the driving assistance controller 1 and the engine controller 2. It is also possible for the "controller" to be configured from only the driving assistance controller 1, and to be configured from an assembly of separate controllers among which the functions of the "controller" are dispersed.

DESCRIPTION OF EFFECTS

The control device (vehicle control system S) for the autonomously driven vehicle according to the present embodiment is configured as described above, and the effects achieved by the present embodiment are summarized below.

Firstly, in regards to an acceleration continuation time Tacc during which the host vehicle accelerates and catches up with other vehicles traveling ahead (a preceding vehicle and another vehicle traveling ahead of the preceding vehicle): when the acceleration continuation time Tacc is long, the acceleration rate characteristic is switched to a high acceleration rate characteristic that yields a higher acceleration rate; and when the acceleration continuation time Tacc is short, the acceleration rate characteristic is switched to a low acceleration rate characteristic that yields a lower acceleration rate. Due to this feature, the acceleration rate characteristic can be made to conform to the actual traffic situation of the road on which the host vehicle is traveling, and out of consideration for the effect on drivability, it is possible to improve fuel consumption while minimizing any decrease in drivability. In this embodiment, the acceleration continuation time Tacc indicates the "frequency of catching up to other vehicles," and the term "catching up" refers to reaching a position at a predetermined headway distance rearward from the other vehicle ahead. According to the present embodiment, the "frequency of catching up to other vehicles" can easily be comprehended from the acceleration continuation time Tacc.

Secondly, a plurality of characteristics, specifically the high acceleration rate characteristic for the high acceleration mode and the low acceleration rate characteristic for the low acceleration mode, are set in advance as the acceleration rate characteristic, and the acceleration rate is changed by switching these characteristics. The acceleration rate characteristic can thereby be made to conform more appropriately through individual settings suited respectively to cases when the acceleration continuation time Tacc is long (low frequency cases) and cases when the acceleration continuation time Tacc is short (high frequency cases).

Thirdly, when the acceleration continuation time Tacc is long even though the host vehicle is traveling in the low acceleration mode, and the frequency of catching up to other vehicles is low, the acceleration rate characteristic is switched to the high acceleration rate characteristic yielding a higher acceleration rate, whereby it is possible to minimize the worsening of fuel consumption caused by gradual acceleration being continued over a long time. In a traffic situation in which, for example, other vehicles traveling in the same lane are sparse, it is possible to quickly transition to cruising at the target vehicle speed Vtrg after the start of acceleration by raising the acceleration rate.

Conversely, when the acceleration continuation time Tacc is short even though the host vehicle is traveling in the high acceleration mode, and the frequency of catching up to other vehicles is high, the acceleration rate characteristic is switched to the low acceleration rate characteristic yielding a lower acceleration rate, whereby it is possible to minimize the worsening of fuel consumption caused by rapid acceleration and stopping or braking being repeated within a short time. In a traffic situation in which, for example, the distance from the host vehicle to another vehicle ahead is not very long, the acceleration rate is lowered, whereby it is possible to avoid rapid acceleration or deceleration and to approach the other vehicle while accelerating gradually.

To use a case of traveling on a high-speed road as an example, when the host vehicle is traveling on a high-speed road, the high acceleration mode is selected by default (S102 of FIG. 2), and control of the acceleration rate is basically performed using the high acceleration rate characteristic (S201 of FIG. 3). In a case in which the traffic situation is such that the gap between vehicles is comparatively short, the host vehicle has begun to accelerate, and the host vehicle then catches up to another vehicle before the vehicle speed VSP reaches the target vehicle speed Vtrg or the vehicle speed VSP has then reached the target vehicle speed Vtrg but the host vehicle then immediately catches up to another vehicle, the acceleration rate characteristic is switched to the low acceleration rate characteristic as a result of the conformity determination (S209). In a case in which the traffic situation is such that the gap between vehicles is comparatively short, the host vehicle has begun to accelerate, and the gap between the vehicles then increases and acceleration has continued for a long time due to the low acceleration rate characteristic, the acceleration rate characteristic is returned to the high acceleration rate characteristic (S111).

In the description above, a case of switching the acceleration rate characteristic itself in accordance with the "frequency of catching up to other vehicles traveling ahead" was described. However, this example is not provided by way of limitation; when the frequency of catching up to other vehicles is low while traveling in the low acceleration mode, or specifically when the acceleration continuation time Tacc under the low acceleration rate characteristic is long, a revision to increase the characteristic line of the low acceleration rate characteristic (the acceleration gain gI1 shown in FIG. 4) may be made. Similarly, when the acceleration continuation time Tacc under the high acceleration rate characteristic is short and the frequency of catching up to other vehicles is high while traveling in the high acceleration mode, a revision to reduce the characteristic line of the high acceleration rate characteristic (the acceleration gain gh1 shown in FIG. 4) may be made.

Due to this configuration, in cases in which, for example, a low fuel consumption mode prioritizing fuel consumption and a high output mode prioritizing output can be set by the driver making a selection, the acceleration rate is controlled according to the low acceleration rate characteristic in low fuel consumption mode, and the acceleration rate is controlled according to the high acceleration rate characteristic in the high output mode, it is possible to achieve acceleration rate characteristic conformity while maintaining the driver's selection (i.e., without switching the driving mode itself).

Furthermore, the revision made to the acceleration rate characteristic, or specifically, the amount of the increase revision made to the low acceleration gain gI and the amount of the decrease revision made to the high acceleration gain gh are not necessarily equal, and can be changed in stages or continuously in accordance with the acceleration continuation time Tacc as well as the frequency of catching up to other vehicles. Specifically, during travel in the low acceleration mode, the amount of the increase revision made to the low acceleration gain gI is increased by a greater amount with a longer acceleration continuation time Tacc and a lower frequency, and during travel in the high acceleration mode, the amount of the decrease revision made to the high acceleration gain gh is increased by a greater amount with a shorter acceleration continuation time Tacc and a higher frequency. It is thereby possible to make the acceleration rate characteristic conform more precisely to the actual traffic situation.

Furthermore, as shall be apparent, a revision corresponding to the frequency of catching up to other vehicles may be made to one preset acceleration rate characteristic without switching the acceleration rate characteristic.

An embodiment of the present invention was described above, but the above embodiment merely presents part of an example of application of the present invention, there being no intention to limit the technical range of the present invention to the specific configuration of the above embodiment. Various changes and revisions can be made to the above embodiment within range of the matters set forth in the claims.

The invention claimed is:

1. A control method for an autonomously driven vehicle, the control method comprising:
   controlling an acceleration rate of a host vehicle so that a vehicle speed during autonomous driving is caused to approach a target vehicle speed;
   upon the host vehicle catching up with another vehicle traveling ahead, limit the vehicle speed of the host vehicle in accordance with a headway distance to another vehicle;
   calculating an acceleration continuation time from a start to an end of acceleration when the host vehicle catches up to the other vehicle traveling ahead; and
   changing the acceleration rate upon the host vehicle approaching the target vehicle speed in accordance with the acceleration continuation time that was calculated such that the acceleration rate is increased by a greater amount commensurately as the acceleration continuation time becomes longer.

2. The control method according to claim 1, wherein the acceleration rate is reduced when the acceleration continuation time is less than a predetermined time.

3. The control method according to claim 1, wherein
the acceleration rate of the host vehicle is controlled according to a first acceleration rate characteristic yielding a high acceleration rate at the same vehicle speed or a second acceleration rate characteristic yielding an acceleration rate lower than the first acceleration rate characteristic, and
the acceleration rate is changed by switching between the first acceleration rate characteristic and the second acceleration rate characteristic in accordance with the acceleration continuation time.

4. The control method according to claim 3, wherein
during travel under the first acceleration rate characteristic, a switch is made to the second acceleration rate characteristic when the acceleration continuation time is less than a predetermined time; and
during travel under the second acceleration rate characteristic, a switch is made to the first acceleration rate characteristic when the acceleration continuation time is longer than a predetermined time.

5. The control method according to claim 3, wherein
instead of the switching between the first acceleration rate characteristic and the second acceleration rate characteristic, the acceleration rate characteristics are revised in accordance with the acceleration continuation time;
during travel under the first acceleration rate characteristic, the acceleration rate yielded by the first acceleration rate characteristic is reduced when the acceleration continuation time is less than a predetermined time; and
during travel under the second acceleration rate characteristic, the acceleration rate yielded by the second acceleration rate characteristic is increased when the acceleration continuation time is longer than a predetermined time.

6. A control method for an autonomously driven vehicle, the control method comprising:
controlling an acceleration rate of a host vehicle so that a vehicle speed during autonomous driving is caused to approach a target vehicle speed, the acceleration rate being controlled by switching between a first acceleration rate characteristic yielding a high acceleration rate at the same vehicle speed and a second acceleration rate characteristic yielding a lower acceleration rate than the first acceleration rate characteristic;
determining an end of acceleration performed according to the acceleration rate characteristics both during travel under the first acceleration rate characteristic and during travel under the second acceleration rate characteristic;
during traveling under the second acceleration rate characteristic, when the host vehicle has reached the target vehicle speed and then caught up with another vehicle traveling ahead of the host vehicle at a vehicle speed lower than the target vehicle speed, a switch is made to the first acceleration rate characteristic or the acceleration rate yielded by the second acceleration rate characteristic is increased; and
during traveling under the first acceleration rate characteristic, when the host vehicle has reached the target vehicle speed and then caught up with the other vehicle, a switch is made to the second acceleration rate characteristic or the acceleration rate yielded by the first acceleration rate characteristic is reduced.

7. A device for controlling an autonomously driven vehicle, the device comprising:
a vehicle drive source; and
a controller that controls the drive source, the controller comprising
an acceleration control unit that controls an acceleration rate of a host vehicle so that a vehicle speed during autonomous driving is caused to approach a target vehicle speed, and
a vehicle-speed-limiting unit that limits the vehicle speed of the host vehicle in accordance with a headway distance to another vehicle traveling ahead of the host vehicle when the host vehicle has caught up with the other vehicle; and
the acceleration control unit calculating an acceleration continuation time from a start to an end of acceleration when the host vehicle catches is up to the other vehicle traveling ahead, and changing the acceleration rate upon the host vehicle approaching the target vehicle speed in accordance with the acceleration continuation time that was calculated such that the acceleration rate is increased by a greater amount commensurately as the acceleration continuation time becomes longer.

8. A control method for an autonomously driven vehicle, the control method comprising:
controlling an acceleration rate of a host vehicle so that a vehicle speed during autonomous driving is caused to approach a target vehicle speed;
upon the host vehicle catching up with another vehicle traveling ahead, limit the vehicle speed of the host vehicle in accordance with a headway distance to another vehicle;
calculating an acceleration continuation time from a start to an end of acceleration when the host vehicle catches up to the other vehicle traveling ahead; and
changing the acceleration rate upon the host vehicle approaching the target vehicle speed in accordance with the acceleration continuation time that was calculated such that the acceleration rate is increased by a greater amount commensurately as the acceleration continuation time becomes longer.

* * * * *